Oct. 14, 1958 E. T. KONIECZKA 2,855,980
PORTABLE SEAT FOR HUNTERS
Filed Oct. 12, 1956 2 Sheets-Sheet 1
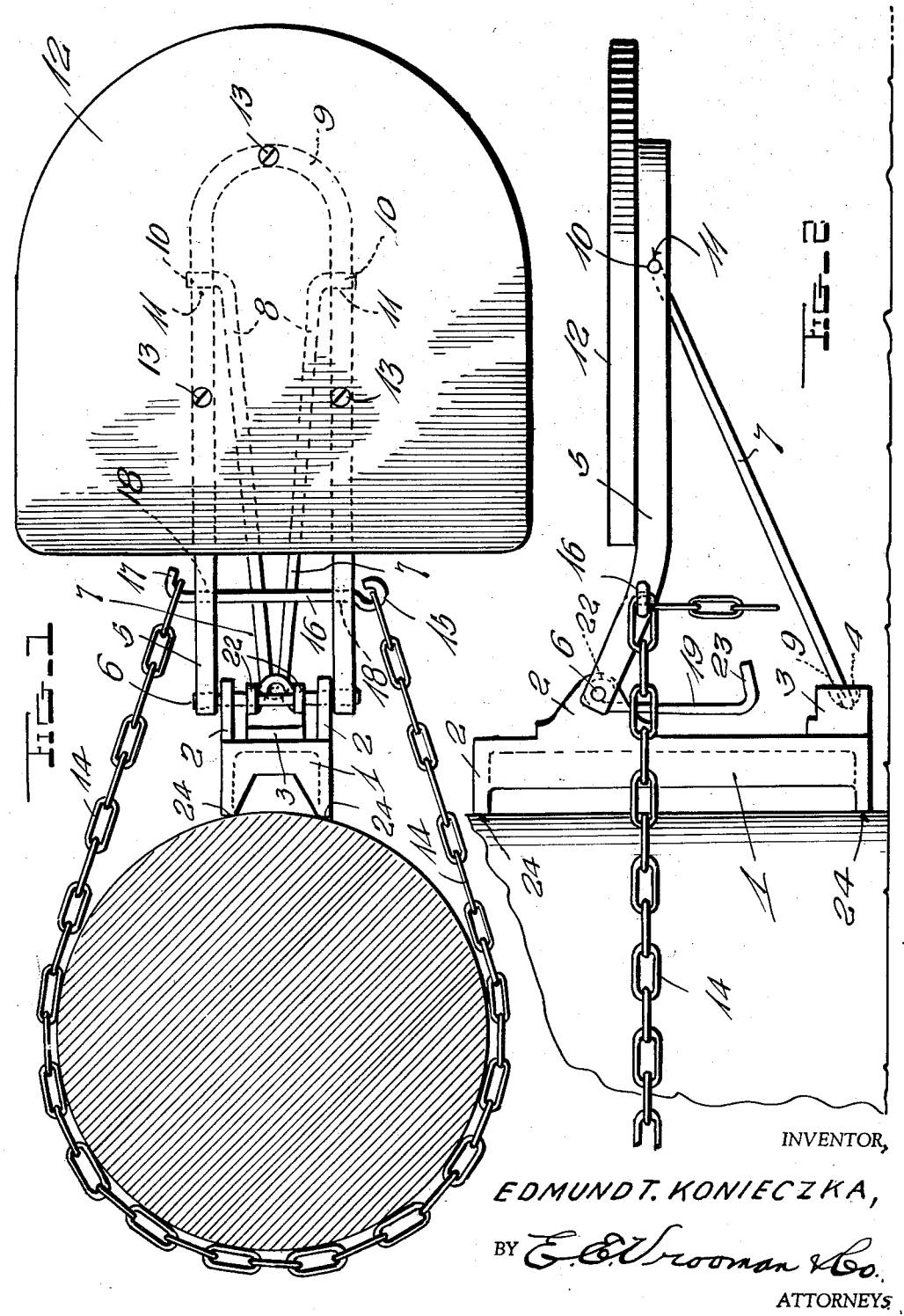
INVENTOR,
EDMUND T. KONIECZKA,
BY
ATTORNEYS

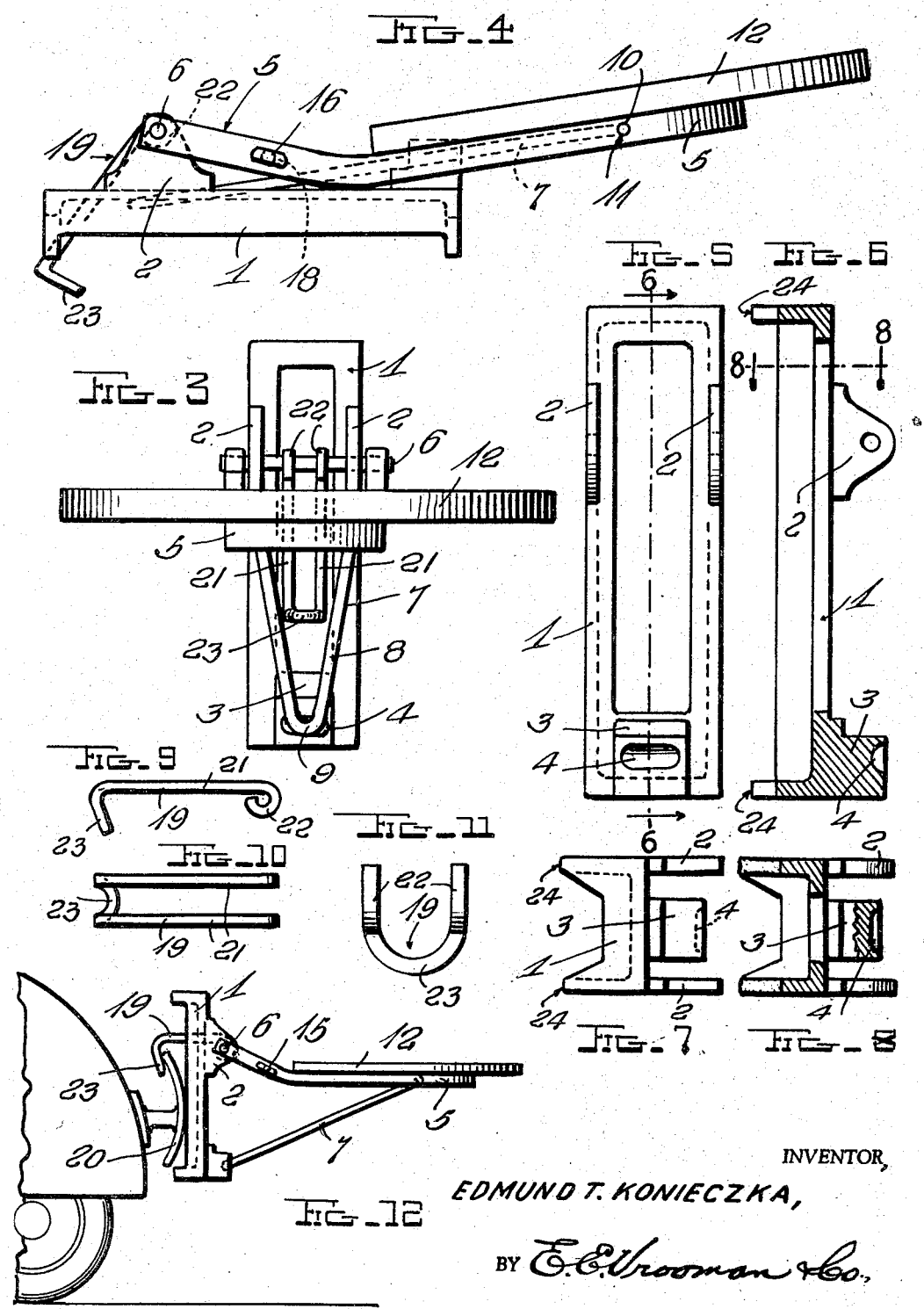

United States Patent Office 2,855,980
Patented Oct. 14, 1958

2,855,980

PORTABLE SEAT FOR HUNTERS

Edmund T. Konieczka, Nekoosa, Wis.

Application October 12, 1956, Serial No. 615,659

1 Claim. (Cl. 155—78)

This invention relates to a portable seat for hunters.

An object of the invention is the provision of a novel seat structure that can be easily transported, usually in a motor vehicle, and which is adapted for placement upon a suitable support, such as a tree or post, or on the bumper of a motor vehicle.

Another object of the invention is the construction of an efficient foldable mechanism, which in a folded condition can be easily transported, and upon the owner arriving at a destination, it can be quickly extended or unfolded for placement upon a suitable support, so that the owner or hunter can have an admirable and comfortable place for resting.

A further object of the invention is to construct a portable sportsman's seat which may be readily and quickly fastened to a fixed support for the use of a sportsman while resting under hunting conditions.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a plan view of the portable seat for hunters, while

Figure 2 is a view in side elevation of the same.

Figure 3 is an end view in elevation.

Figure 4 is a side view in elevation of the apparatus shown in a folded condition.

Figure 5 is a plan view of the aluminum main bracket of the apparatus.

Figure 6 is a sectional view of the main bracket or casing taken on line 6—6, Figure 5, and looking in the direction of the arrows.

Figure 7 is an end view of the main bracket or casing shown in Figures 5 and 6.

Figure 8 is a sectional view taken on line 8—8, Figure 6, and looking in the direction of the arrows.

Figure 9 is a view in side elevation of the bumper hook, while

Figure 10 is a top plan view of the same.

Figure 11 is an enlarged end view of the bumper hook.

Figure 12 is a fragmentary view of a motor vehicle, showing the apparatus applied to the bumper thereof.

Referring to the drawings by numerals, 1 designates the main aluminum straight elongated bracket which is open at its center as shown. The main bracket 1 is provided with parallel upper angular brackets 2 formed at its side edges. This main bracket 1 is also provided with a lower bracket 3 at its lower edge; this lower bracket 3 extends outwardly from the same side (Fig. 6) of the main bracket as do the upper brackets 2. In the lower bracket 3 is a socket 4.

An elongated U-shaped seat bracket 5 is bent outwardly near its center (Fig. 4) and this bracket 5 is pivotally mounted at 6 on the pin, as shown.

A seat support 7 is provided which comprises two arms 8 that are integrally connected at 9. This end 9 is seated in the socket 4 when the apparatus is in its set position as shown in Figures 1 and 2. The outer ends of arms 8 are spread apart, Fig. 1. These outer ends 10 are normally seated in apertures 11 (Fig. 6) of the upper brackets 2. When so seated, the inner ends 9 are then seated in the socket 4.

The seat 12 is secured to the top of the seat bracket 5 by means of screws 13.

A chain is employed to mount or secure the apparatus upon a post or tree. This chain 14 is mounted upon the eye 15 of the chain hook 16 and upon the hook 17 of said chain hook 16. This chain hook 16 extends through slots 18 (Fig. 4) formed in the seat brackets 5. The hook 17 is formed by bending one end of the chain hook 16 after it has been positioned upon the seat bracket 5.

To attach the apparatus to the bumper of a motor vehicle (Fig. 12), the bumper hook 19 is hooked over the bumper 20 as shown, the hook 19 being provided with two sides 21. These sides 21 of hook 19 have eyes 22 on their inner ends and an integral hook 23 is formed on the outer end of bumper 19. When the apparatus is attached to the bumper 20, the breadth of the aluminum bracket, together with the bumper hook 19 will securely hold the apparatus in its open or unfolded condition upon said bumper.

By constructing several parts of the apparatus out of aluminum, the apparatus will be relatively light in weight; also by removing the seat support from engagement with the socket 4 and folding the parts as shown in Figure 4, the apparatus can be stored in a relatively small space whereby it is readily accommodated to the trunk or body of a motor vehicle.

It is to be understood that the main bracket 1 is placed against the post or tree, as shown in Figure 1, with its flanged edges 24 resting against the post or tree, whereby a satisfactory grip is obtained, after the operator has placed the apparatus at the desired height upon the supporting object.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

A portable seat for hunters, comprising a main bracket provided with upper parallel angular brackets and also provided with a lower bracket at its lower edge, said lower bracket provided with a socket, a pin and means mounting said pin on said main bracket, a U-shaped bracket mounted on the ends of said pin, a seat support provided with a lower end and with upper spaced ends, said lower end seated in said socketed bracket, said U-shaped seat bracket provided with apertures, said seat support having its upper spaced ends positioned in said apertures, and a seat and means securing said seat to said U-shaped seat bracket.

References Cited in the file of this patent

UNITED STATES PATENTS

| 159,309 | Fisher | Feb. 2, 1875 |
| 597,739 | Prentiss | Jan. 25, 1898 |
| 602,210 | Coulson et al. | Apr. 12, 1898 |
| 2,510,900 | O'Neil | June 6, 1950 |
| 2,512,174 | Roeder | June 20, 1950 |
| 2,601,888 | Schopper | July 1, 1952 |

FOREIGN PATENTS

| 10,885 | Great Britain | June 5, 1894 |